United States Patent [19]

Besik

[11] 4,033,875
[45] July 5, 1977

[54] WASTE WATER TREATMENT APPARATUS

[75] Inventor: Ferdinand Besik, Mississauga, Canada

[73] Assignee: Ontario Research Foundation, Sheridan Park, Canada

[22] Filed: Nov. 8, 1976

[21] Appl. No.: 739,491

Related U.S. Application Data

[62] Division of Ser. No. 542,716, Jan. 21, 1975.

[52] U.S. Cl. .................................. 210/197; 210/207
[51] Int. Cl.² .................................... C02C 1/26
[58] Field of Search ............ 210/150, 151, 194, 17, 210/15, 261, 262, 256, 252, 198 R, 195 S, 197, 205, 207, 218, 220, 221 R, 221 P

[56] References Cited

UNITED STATES PATENTS

| | | | |
|---|---|---|---|
| 3,853,752 | 12/1974 | Tymoszczuk | 210/150 |
| 3,980,556 | 9/1976 | Besik | 210/17 |

Primary Examiner—Thomas G. Wyse
Assistant Examiner—Benoit Castel
Attorney, Agent, or Firm—Sim & McBurney

[57] ABSTRACT

A waste water treatment apparatus has a cylindrical container, an inverted funnel in the container defining a flow path for liquid through the container, an inlet communicating with the container outside the funnel and an outlet communicating with the container inside the funnel, a riser tube centrally and axially located within the container and having liquid discharge means communicating with the upper end thereof and a gas feed tube for discharge of gas into the riser tube at its lower end to draw material into and up the riser tube for discharge from the discharge means into liquid in the container outside the funnel.

3 Claims, 5 Drawing Figures

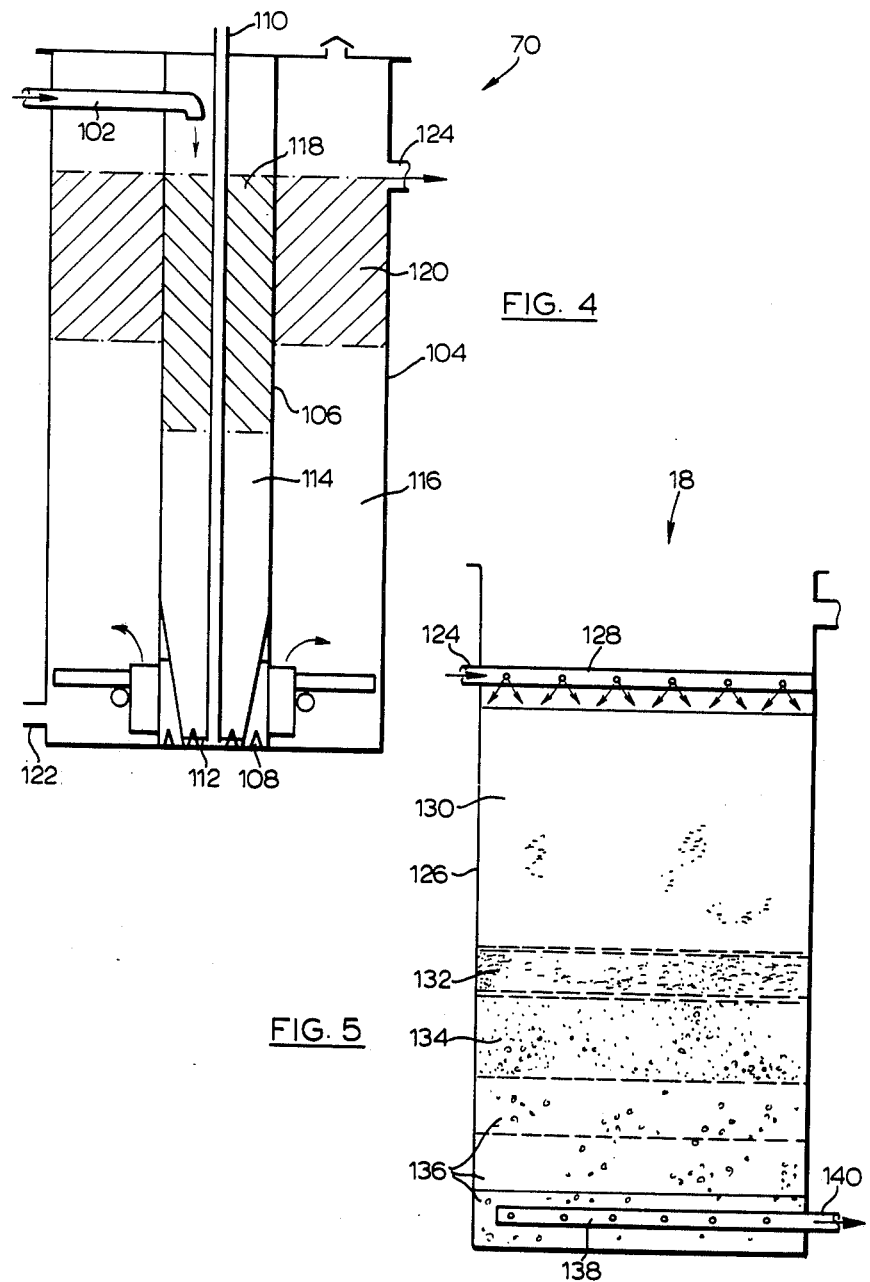

WASTE WATER TREATMENT APPARATUS

This is a division of application Ser. No. 542,716 filed Jan. 21, 1975.

FIELD OF INVENTION

This invention relates to waste water treatment apparatus.

BACKGROUND TO THE INVENTION

Waste water renovation systems have been proposed in the past utilizing a plurality of treatment steps to remove the contaminants. These prior art systems generally have been cumbersome and time-consuming and have required considerable maintenance.

SUMMARY OF INVENTION

In accordance with the present invention, there is provided a waste water treatment apparatus for the treatment of waste water containing a plurality of contaminants. The apparatus includes a cylindrical container and an inverted funnel located in the container defining a flow path for liquid through the container. An inlet for liquid communicates with the container externally of the funnel while an outlet communicates with the container internally of the funnel. A riser tube is centrally and axially located within the container and has liquid discharge means communicating with the upper end thereof. A gas feed tube is provided for discharge of gas into the riser tube at its open lower end to draw material into and up the riser tube for discharge into liquid in the container outside the funnel.

BRIEF DESCRIPTION OF DRAWINGS

FIG. 4 is a sectional schematic representation of a chemical treatment unit for use in the system of FIG. 1; and FIG. 5 is a sectional schematic representation of a fixed bed adsorption-biooxidation unit for use in the system of FIG. 1.

DESCRIPTION OF PREFERRED EMBODIMENTS

Figure 1:
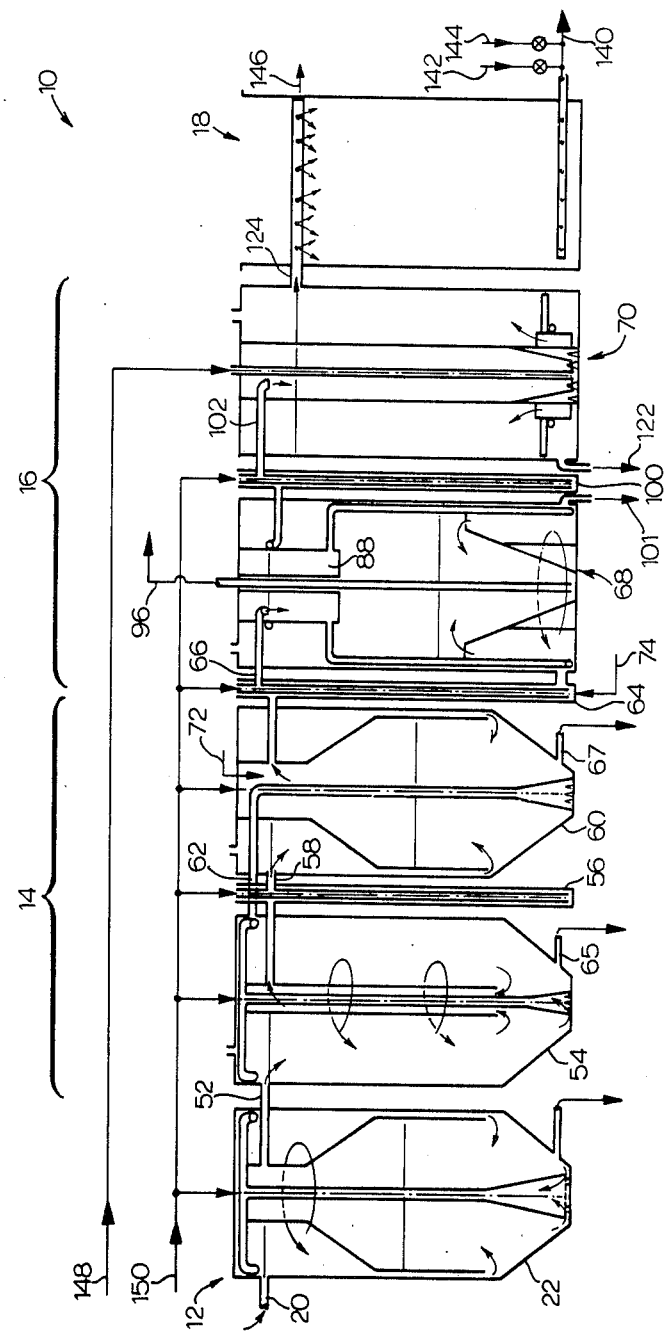
FIG. 1 is a schematic representation of a waste water treatment system embodying the apparatus of this invention.

A four-stage sewage treatment system 10 includes a primary treatment 12, an adsorption-biooxidation treatment 14, a chemical treatment 16 and a fixed bed absorption-biooxidation treatment 18.

Figure 2:
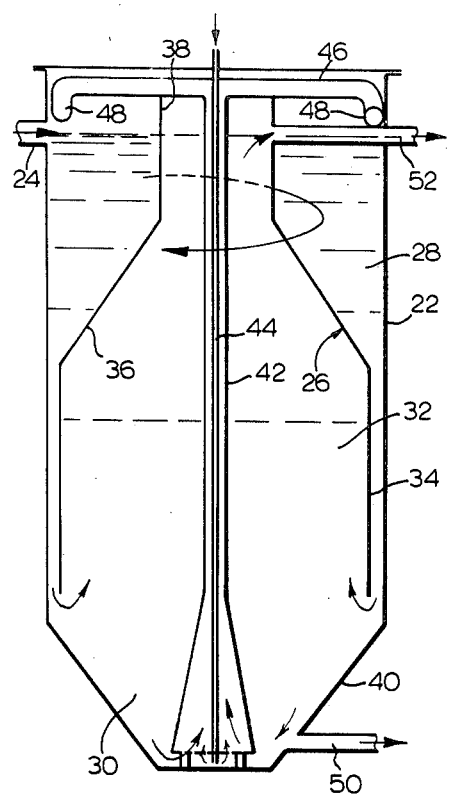
FIG. 2 is a sectional schematic representation of a primary treatment unit constructed in accordance with this invention and for use in the system of FIG. 1.

Raw comminuted sewage is fed by line 20 to the primary treatment 12. Was may be seen in more detail in FIG. 2, the primary treatment 12 occurs in a circularly cross-sectioned reactor 22. An inverted funnel-like member 26 is located within the container 22 and defines therewith a first chamber 28 between the funnel-like member 26 and the container 22, a sludge settling chamber 30 and a sludge separation chamber 32 inside the funnel-like member 26.

The funnel-like member 26 includes a skirt portion 34 concentric with and spaced inwardly from the inner wall of the container 22, a truncated cone portion 36 and a throat portion 38 also concentric with the container 22 and extending upwardly above the intended liquid level in the container 22.

The sludge settling chamber 30 also is defined by a truncated conical wall 40 of the container 22 whereby the sludge settling chamber 30 has a decreasing diameter towards the base of the container 22.

A hollow riser tube 42 is positioned axially of the container 22 and extends through the sludge separation chamber 32 into the sludge settling chamber 30 to a location spaced immediately upwardly of the base of the container 22, the riser tube 42 flaring outwardly towards the lower end thereof.

A gas feed tube 44 is situated within the riser tube 42 to feed air, oxygen or other gas into the riser tube 42 adjacent the lower end of the riser tube 42 to draw sludge out of the settling chamber 30 into and up the riser tube 42 under the influence of the gas rising in the tube 42.

The riser tube 42 adjacent its upper extremity but within the reactor 22 communicates with cross-arm members 46 extending radially of the container 22 which in turn communicate with tubular discharge members 48 which include a downwardly-extending portion and a horizontally-extending portion.

The sewage is fed to the container 22 through pipe 24 and is mixed with recycling mixed liquor suspended solids fed from the discharge members 48. The tangential discharge of the recycling MLSS causes rotation of the reacting liquor in the first chamber 28 about the axis of the container 22.

The rotation of the material in the chamber 28 applied centrifugal forces to the suspended solids, causing the solids having a specfic gravity greater than the liquid medium to concentrate adjacent the inner wall of the container 22. While the solids having a specific gravity less than the liquid tend to move towards the axis of the reactor 22.

Gravitational forces acting on the heavy solids causes them to settle towards the sludge settling chamber 40. Anaerobic decomposition of the settled solids in the chamber 40 occurs, decreasing their volume and mass. The rotation of the solids in the chamber 28 provides the mixng required to speed up the anaerobic reactions.

The lighter suspended solids move upward with the waste water through the sludge separation chamber 32, wherein further gravitational separation of suspended solids occurs.

The microorganisms in the liquid consist of facultative and anaerobic bacteria responsible for hydrolysis and fermentation of complex organic compounds to simple organic acids. The microorganisms tend to be retained and are recycled with the recirculating sludge in riser tube 42 and hence assist in hydrolyzing and decomposing the suspended solids.

In this way, suspended solids present in the sewage feed in line 24 and separated in the chambers 28, 30 and 32 are continuously hydrolyzed and fermented, thereby continuously decreasing their volume and mass. Thus, withdrawal of solids from the reactor 22 rarely is required, such withdrawal being made typically by pipe 50. The reactor 22 also tends to decrease the concentration of soluble organic matter and to equalize wide variations in soluble organic matter concentration in the feed sewage.

The processed waste water is removed from the upper portion of the chamber 32 through a pipe 52 for passage to the absorption-biooxidation treatment 14.

The absorption-biooxidation treatment consists of contact with activated carbon and a mixed microbial population in a reactor 54. This contact serves to remove organic matter, organic nitrogen, ammonia and nitrite and nitrate nitrogen from the processed waste water.

The waste water, if required, may be flash aerated from the reactor 54 by external flash aerator 56 and passed by line 58 to a clarifier 60. In thie clarifier 60, the biological reactions are extended, functioning thereby, in effect, as a second stage reactor. The suspended solids are separated from the liquid phase in the clarifier 60 by settling. THe settled sludge mainly is withdrawn from the clarifier 60 by a flash aerator for recycle, after saturation with oxygen, to the reactor 54 by line 62. The clarified effluent is removed from the clarifier 60 by external riser 64 for discharge from the absorption-biooxidation treatment 14 by line 66 to the chemical treatment 16. Excess sludge may be withdrawn from the absorption-biooxidation treatment 14 by pipes 65 and 67 respectively associated with the reactor 54 and clarifier 60.

The adsorption-biooxidation treatment 14 is described in more detail and forms the subject of copending U.S. Pat. Ser. No. 540,513 filed Jan. 13, 1975 (now U.S. Pat. No. 3,980,556).

Reference may be had to the latter application for additional process and constructional details of the reactor 54 and the clarifier 60.

The processed waste water in line 66 is passed to the chemical treatment 16, which consists of a phosphate removal unit 68 and an ozonation unit 70. Prior to feed of the processed waste water to the phosphate removal unit 68, a chemical coagulant, typically alum, is added to the processed waste water by line 72. If desired, additional chemicals such as hypochlorite may be added, as may an anionic polymer by line 74.

Figure 3:
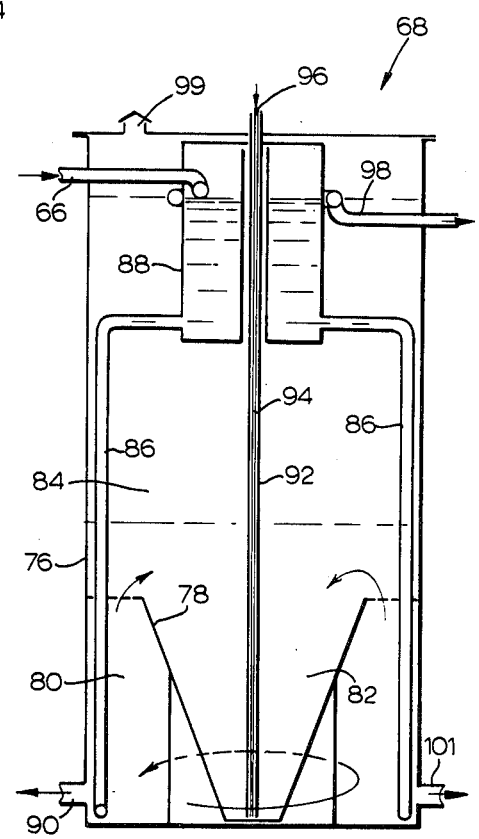
FIG. 3 is a sectional sehematic representation of a phosphate removal unit for use in the system of FIG. 1.

As may be seen more particularly from FIG. 3, the phosphate removal unit 68 consists of a cylindrical container 76 in which a conical body member 78 is positioned, defining a first chamber 80 between the conical body member 78 and the interior wall of the container 76, a second chamber 82 within the conical body member 78 and a third chamber 84 located above the conical body member 78.

The processed waste water in line 66 with added chemicals is fed tangentially into the first chamber 80 through outlet pipe 86 of a hydrostatic head boxy 88 located in the upper portion of container 72. The processed waste water in line 66 also may include occasional loss of biological sludge from the clarifier 60. This loss provides automatic and self-regulating control of the concentration of the microbial population in the absorption-biooxidation treatment 14.

The first chamber 80, which acts as a reaction chamber for phosphates, contains coagulated suspended solids, i.e. chemical sludge, which are maintained in a rotating fluidized bed. The rotation of the sludge in the first chamber 80 is maintained by the tangential inlet flow throughout outlet pipes 86 at the lower ends thereof and further by action of external riser tube 64 communicating with the first chamber 80 through opening 90.

The upflow velocity of the liquid in the first chamber 80 is responsible for fluidization of the coagulated particles in at least the upper portion of the chamber 80. The upflow velocity is proportional to the flow rate of the waste water through outlet pipes 86 and to the cross-sectional area of the first chamber 80.

The chemical reactions between the added chemicals and the impurities occur in the lower portion of the first chamber 80 and the coagulation of the formed flocs occurs in the upper portion of the first chamber 80. The coagulated flocs tend to form a layer of chemical sludge in the upper portion of the first chamber 80 which absorbs impurities and hence tends to increase the overall removal efficiency of the unit.

The coagulated sludge overflows from the first chamber into the second chamber 82, which acts as a settling chamber for the coagulated sludge. The conical shape of the second chamber 82 causes thickening of the sludge therein. A riser tube 92 extends axially through the unit and terminates immediately above the base of the second chamber 82.

A gas flow tube 94 is positioned internally of the riser tube 92 for feed of air, or other gas, into the riser tube 92 adjacent the lower end thereof, the consequent upward flow of gas in the riser tube 92 causing material to be drawn from the second chamber 82 into and upwardly in the riser tube 92 for discharge of the chemical sludge from the unit 68 through pipe 96, either continuously or intermittently, as desired.

The chemically-treated and clarified waste water flows upwardly from the first chamber 80 to the third chamber 84 for removal from the unit 68 through pipe 98.

Gases formed in the phosphate removal unit 68 may be vented therefrom by vent 99. Sludge accumulations in the first chamber 80 may be removed through pipe 101 as required.

The chemically-treated effluent from the phosphate removal unit 68 in line 98 is fed by an external riser tube 100 into the ozonation unit 70 though pipe 102. The ozonation unit 70 includes an outer cylindrical container 104 and an inner cylindrical tube 106 perforated at its lower end by perforations 108.

An ozone feed tube 110 is located axially of the inner cylindrical tube 106 and terminates at its lower end in a diffuser ring 112 located above the perforation 108.

The inner cylindrical tube 106 and the outer cylindrical container 104 defined inner and outer chambers 114 and 116 respectively within the ozonation unit 70. An upper portion of the inner chamber 114 is packed with polyethylene pall rings 118 or similar floating packing material. Similarly, an upper portion of the outer chamber 116 is packed with polyethylene pall rings 120 or similar floating packing material.

The liquid to be treated is fed by line 102 to the top of the inner chamber 114. As the waste water moves downwardly through the inner chamber 114 towards the perforations 108, it is countercurrently contacted with ozone and oxygen fed to the inner chamber 114 through the diffuser 112. The waste water absorbs ozone and oxygen from the rising gas bubbles.

The downward velocity of the waste water through the inner chamber 114, which determines the contact time of the gas bubbles in the inner chamber 114 and hence the proportion of oxygen and ozone absorbed by the liquid, is less than the velocity of upward flow of the gas bubbles but greater than one-third of the velocity of a single bubble rising in stationary liquid.

As the concentration of the ozone in the bubble volume decreases due to the diffusion of ozone into the liquid as the gas rises in the inner chamber 114, a concentration gradient develops in the gas bubbles and the rate of mass transfer decreases.

When the gas bubbles encounter the packing 118, they break down and reform. There results mixing of the gas in the volume of the bubble, disrupting the concentration gradient established in the radial direction of the bubble and increasing the concentration of ozone and oxygen at the bubble surface, and hence increasing the mass transfer rate of the diffusing absorbing gases in the packing 118.

The presence of the floating packing 118 in the first chamber 114 prevents axial mixing of the liquid, thereby creating conditions for a continuous multistage absorption.

The ozone saturated waste water exits from the first chamber 114 through perforations 108 into the lower portion of the second chamber 116. Suspended solids present in the waste water settle out in the second chamber 116 and may be periodically removed from the ozonation unit 70 by line 122.

Oxidation of the contaminants present in the waste water occurs as the water rises in the chamber 116 first through the lower portion and then through the packing 120. A fine precipitate is formed in the oxidation and is trapped in the packing bed 120. The volume of precipitate is very small and hence long continuous operation of the ozonation unit 70 is achieved before backwash of the packing bed 120 is required.

Oxidized waste water is removed from the ozonation unit 70 though pipe 124 located at the top of the second chamber 116. The oxidation of the waste water in the ozonation unit 70 results in an effluent of decreased colour, odor and turbidity, containing chemically oxidized organic and inorganic compounds and is disinfected.

If further treatment is required, the effluent from the chemical treatment may pass by line 124 to the fixed bed absorption-biooxidation treatment 18. The adsorption-biooxidation treatment 18 is conducted in a cylindrical vessel 126, shown in detail in FIG. 5, and having a multiple number of beds of different materials therein for percolation of the waste water feed in line 124 therethrough.

The waste water in line 124 is fed into the vessel 126 through a distributor 128 on the upper surface of a bed 130 of granular activated carbon. Suspended solids are removed from the waste water by the granular activated carbon bed 130 by filtration and the dissolved organic matter is removed by adsorption on the activated carbon. The concentration of organic matter on the surfaces of the activated carbon increases to the point where microorganisms can survive and biooxidation can occur.

The concentration of residual organic material in the waste water in line 124 is very low and hence the dissolved oxygen present in the waste water is sufficient for the biooxidation and additional aeration is not required.

Backwashing of the fixed carbon bed 130 is required only very infrequently and hence the microbial population in the media is acclimatised to the type of food present in the waste water. Therefore, the adsorptive capacity of the activated carbon is continuously restored by the microorganisms and thus consistent removal of organic carbon from the waste water on the fixed carbn bed 130 is achieved.

Successive beds of anthracite 132, sand 134 and gravel 136 are provided for consecutive filtration of residual suspended solids from the waste water, the processed water being recovered from the vessel 126 through collector 158 and line 140.

Valved backwash water and air feed lines 142 and 144 respectively may be provided along with a backwash overflow line 146.

Ozone for the ozonation unit 70 is provided by line 148 from any convenient source thereof. The air required for the flash aerators in the primary treatment vessel 22, the adsorption-biooxidation reactor 54 and clarifier 60 and the riser tubes 56, 64, 82 and 100 may be provided by a common air line 150 with suitable valving, as required.

The hydraulically-integrated waste water treatment system 10 therefore provides a four-stage treatment of waste water to remove substantially completely contaminants from the waste water, including suspended solids, organic material, nitrogenous material, phosphates, coliform, turbidity and odor, in which movement of liquids is achieved by utilizing gravity or air riser tubes.

The filtered effluent in line 140 may be treated further, if desired or required, to provide water of potable quality. Such procedures may include one or a combination of evaporation, reverse osmosis, ion-exchange and disinfection. Solid wastes removed from the system in lines 50, 65, 67, 96, 101 and 122 may be disposed of in any desired manner. The quantity of wastes requiring disposal is, however, quite small.

EXAMPLE

An approximately 4000 gallon per day sewage treatment pilot plant operation was set up utilizing the equipment illustrated in FIG. 1 and was operated continuously for a period of 38 days. The contaminats of the sewage in the feed line 20 varied widely over the test period. The operation was unattended except for the taking of samples for analysis.

The hydraulic characteristics of the pilot plant operation over the test period are reproduced in the following Table I:

TABLE I

| Characteristic | Range | Average |
| --- | --- | --- |
| Feed flow rate GPD | 1872 to 4896 | 3168 |
| Hydraulic detention time (Hrs.-based on Q) | | |
| Primary clarifier | 2.9 to 7.7 | 4.5 |
| A-B process - reactor | 4.3 to 11.0 | 6.7 |
| - clarifier | 1.7 to 4.6 | 2.7 |
| Chemical treatment - | | |
| $PO_4$ reactor | 4.8 to 12.8 | 7.4 |
| Ozonation | 2.4 to 6.3 | 3.7 |
| Recycle percent (based on Q) for A-B process | 370 to 490 | 420 |
| Surface overflow rates GPM/ sq. ft. (based on Q) | | |
| primary clarifier | 0.19 to 0.50 | 0.32 |
| A-B clarifier | 0.17 to 0.34 | 0.23 |
| $PO_4$ reactor-clarifier | 0.11 to 0.31 | 0.20 |

The water quality at various locations in the pilot plant was determined, namely, the effluent from the primary clarifier, the effluent from the adsorption-biooxidation process, the effluent from the $PO_4$ reactor-clarifier, the effluent from the ozonation unit and the effluent from the multimedia filtration. These water quality results are reproduced in the following Table II:

TABLE II A

| Contaminant | | Raw Sewage | | Primary Effluent | | % Total Removed Average | A-B Process | | % Total Removed Average |
|---|---|---|---|---|---|---|---|---|---|
| | | Range | Average | Range | Average | | Range | Average | |
| S.S. | mg/l | 63 to 199 | 122 | 16 to 132 | 61 | 50 | 2 to 18 | 9.2 | 92 |
| BOD$_5$ | mg/l | 77 to 217 | 124 | 30 to 202 | 109 | 12 | 5 to 19 | 9.6 | 92 |
| TOC | mg/l | 61 to 124 | 93 | 43 to 142 | 71 | 24 | 6 to 11 | 8 | 91 |
| SOC | mg/l | 27 to 53 | 37 | 18 to 55 | 33 | 11 | 5 to 8.5 | 6.4 | 83 |
| PO$_4$ | mg/l | 14 to 29 | 20 | 14 to 28 | 19 | 5 | 10 to 24 | 15 | 25 |
| NH$_3$—N | mg/l | 12 to 35 | 20 | 16 to 28 | 22 | — | <0.4 | <0.4 | >98 |
| TKN | mg/l | 18 to 35 | 28 | 19 to 32 | 27 | 3 | 0.4 to 5.7 | 2.0 | 93 |
| NO$_3$—N | mg/l | 0.2 to 4.3 | 2.5 | 0.2 to 4.4 | 3.3 | — | 3.0 to 8.7 | 6.3 | — |
| TDS | mg/l | 470 to 590 | 503 | 450 to 600 | 495 | — | 450 to 600 | 516 | +2 |
| Turbidity | ITU | 54 to 125 | 75 | 35 to 74 | 49 | 35 | 0.6 to 6.5 | 1.9 | 97 |
| Coliform | N/100N | ~4 × 10$^7$ | — | ~10$^7$ | 10$^7$ | — | ~10$^5$ | 10$^5$ | — |

Table II B

| Contaminant | | PO$_4$ Treatment | | Ozone Treatment | | % Total Removed Average | Filtered Effluent | | % Total Removed Average |
|---|---|---|---|---|---|---|---|---|---|
| | | Range | Average | Range | Average | | Range | Average | |
| S.S. | mg/l | 0 to 16.2 | 5.6 | 0 to 11.4 | 5.9 | 95 | 0 to 4 | 1.5 | 99 |
| BOD$_5$ | mg/l | 0.9 to 4.0 | 2.5 | 0 to 4.0 | 2.4 | 98 | 0.4 to 3.0 | 1.8 | 99 |
| TOC | mg/l | 2.5 to 9.5 | 5.1 | 0.5 to 7.0 | 3.9 | 96 | 0.5 to 2.0 | 0.96 | 99 |
| SOC | mg/l | 2.0 to 9.0 | 4.4 | 0.5 to 6.0 | 3.5 | 91 | 0 to 2.0 | 0.7 | 98 |
| PO$_4$ | mg/l | <1.0 | <1.0 | <1.0 | <1.0 | >95 | 1.4 to 2.9 | +1.8 | 91* |
| NH$_3$—N | mg/l | <0.4 | <0.4 | <0.4 | <0.4 | >98 | <0.4 | <0.4 | >98 |
| TKN | mg/l | 0.4 to 1.8 | 0.86 | <0.4 to 1.8 | <0.7 | >98 | <0.4 | <0.4 | >99 |
| NO$_3$—N | mg/l | 2.6 to 9.9 | 5.9 | — | — | — | — | — | — |
| TDS | mg/l | 470 to 603 | 548 | 476 to 621 | 555 | +10 | 440 to 641 | 551 | +10 |
| Turbidity | ITU | 0.5 to 3.9 | 1.6 | 0.6 to 3.0 | 1.2 | 98 | 0.1 to 0.4 | 0.2 | >99 |
| Coliform | N/100N | ~10$^4$ | ~10$^4$ | 0 to 4 | 1.6 | ~100 | | | |

*Extraction from filter media.

From the results reproduced in the above Table II, it is possible to calculate the contribution of the individual steps to the overall removal efficiency of the system. The results of this calculation are reproduced in the following Table III:

TABLE III

| Treatment | Contaminant | | | | | | | | |
|---|---|---|---|---|---|---|---|---|---|
| | BOD$_5$ % | TOC % | SOC % | TKN % | NH$_3$ % | NO$_3$ mg/l | PO$_4$ % | S.S. % | Turb. % | Coli. % |
| Primary | 12 | 24 | 11 | 3 | 0 | +0.8 | 5 | 50 | 35 | — |
| Adsorption-biooxidation | 80 | 67 | 72 | 90 | >98 | +3.0 | 20 | 42 | 62 | — |
| Chemical | 6 | 5 | 8 | 5 | 0 | −0.4 | 70 | 3 | 1 | >99.99 |
| Media Filtration | 1 | 3 | 7 | 1 | 0 | — | −4 | 4 | 1 | — |
| Total | 99 | 99 | 98 | 99 | 98 | — | 91 | 99 | 99 | >99.99 |

The above tabulated results demonstrate the effectiveness of the system of FIG. 1 in removing substantially completely organic, nitrogenous, phosphorus, suspended solid and coliform contaminants from waste water.

The sewage treatment system 10 may be designed to handle a wide range of liquid feed rates while remaining unattended, typically from 5000 to 100,000 gallons per day, and hence provide an effective waste water renovation system for use in apartment blocks, and the like.

SUMMARY

The present invention, therefore, provides a waste water treatment system comprising four hydraulically-interlinked stages which effectively remove a variety of contaminants from waste water, typically domestic sewage.

What I claim is:

1. A waster water treatment apparatus for the treatment of waste water containing a plurality of contaminants comprising:

a substantially cylindrical container having a truncated conical shape at the lower end thereof, a substantially funnel-shaped member located in inverted manner internally and axially of said container, said funnel-shaped member including a skirt portion concentric with and spaced inwardly from the inner wall of said container, a throat portion concentric with said container and extending upwardly above the intended liquid level in said container and a truncated cone portion joining said skirt portion and said throat portion, said throat portion and said truncated cone portion defining with the inner wall of said cylindrical container a first treatment zone, an inlet pipe to said cylindrical container communicating with said first treatment zone adjacent the intended liquid level therein, an outlet pipe from said cylindrical container communicating with said throat portion at the intended liquid level therein for discharge of treated waste water, a riser tube extending centrally and axially of and through said container terminating at its lower end adjacent the lower end of said container for receipt therein of material located at said lower end terminating at its upper end in a cross arm member extending radially of said container, outlet pipes integral with each end of said cross arm member, each of said outlet pipes including a downwardly extending portion and a horizontally extending portion for discharge of fluid tangentially a the intended liquid level in the first treatment zone, and a gas feed tube communicating with gas feed means exteriorally of said container and extending from said gas feed means through said riser tube and terminating adjacent the lower end of said riser tube for discharge of gas therein.

2. The apparatus of claim 1 wherein said riser tube is flared outwardly at the lower end thereof.

3. The apparatus of claim 2 including an outlet pipe communicating with the lower end of said container for periodic removal of solids therefrom.

* * * * *